Nov. 13, 1928.
G. A. McCUEAN
1,691,851
SELF TIGHTENING PIPE UNION
Filed Oct. 29, 1926
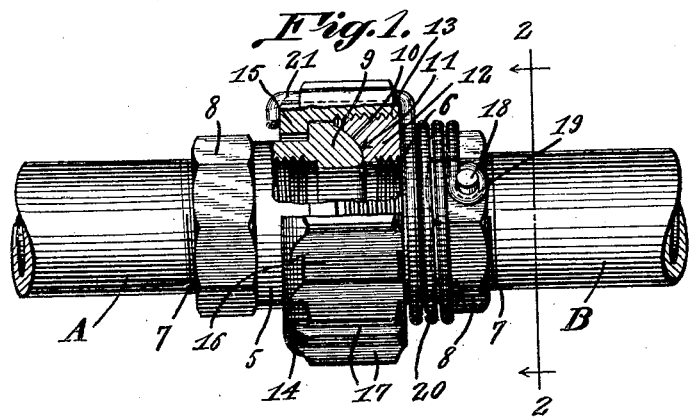
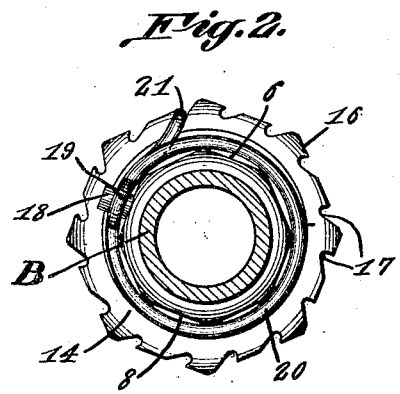
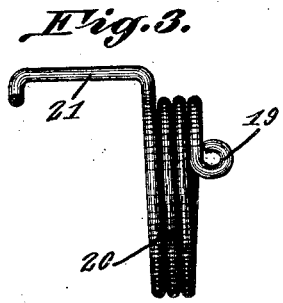
G. A. Mc Cuean, INVENTOR.
BY
Geo. P. Kimmel. ATTORNEY.

Patented Nov. 13, 1928.

1,691,851

UNITED STATES PATENT OFFICE.

GEORGE A. McCUEAN, OF SHARPSBURG, PENNSYLVANIA.

SELF-TIGHTENING PIPE UNION.

Application filed October 29, 1926. Serial No. 145,030.

This invention relates to a pipe coupling or union, and more especially to pipe union locks or self-tightening pipe couplings.

The primary object of the invention is the provision of a union or coupling of this character, wherein the interfitting elements are united in a manner so that the connection will be at all times under a strain or tension, thereby assuring a tight joint or union, without any liability of the connection being disjoined or separated, resultant from jarring, vibration, or the like, the union coupling being of novel form and possessed of self-tightening action.

Another object of the invention is the provision of a union or coupling of this character, wherein the element for uniting the members of the coupling or union is acted upon through the medium of a tensioning element or device, so as to have the same self-tightening at all times when the coupling or union is in use for the joining of pipe sections, the parts of the coupling or union being readily separable from each other when desired.

A further object of the invention is the provision of a coupling or union of this character, which is comparatively simple in construction, thoroughly reliable and efficient in its purpose, strong, durable, neat in appearance, positive for tightening action, and inexpensive to manufacture and install.

With these and other objects in view, the invention consists in the features of construction, combination and arrangement of parts, as will be hereinafter more fully described, in detail, illustrated in the accompanying drawing, disclosing the preferred embodiment of the invention, and pointed out in the claims hereunto appended.

In the accompanying drawing:

Figure 1 is a fragmentary elevation of pipe sections showing the union or coupling constructed in accordance with the invention applied, a portion of the coupling, being broken away to show details thereof.

Figure 2 is a sectional view on the line 2—2 of Figure 1 looking in the direction of the arrows.

Figure 3 is an elevation of the tensioning element or tightening device for association with the coupling constructed in accordance with the invention.

Similar reference characters indicate corresponding parts throughout the several views in the drawing.

Referring to the drawing in detail A and B designate generally portions of the meeting ends or the ends adjacent to each other of pipe sections, these being of uniform cross sectional diameter and are adapted to be joined or connected together through the medium of a coupling hereinafter more fully described.

The coupling or union comprises a male member 5 and a female member 6, these being in the form of tubular sections having their outer end portions internally threaded to be engaged by the externally threaded ends 7 of the pipe sections A and B which are screwed into the male and female members 5 and 6, respectively. The outer ends of these male and female members 5 and 6 are externally enlarged or flanged and with the enlargement provided with wrench engaging faces 8, so that each member can be conveniently attached to its pipe section in the usual well known manner.

The male member 5 at its inner end is formed with integral head 9, preferably rounded on its free end at 10, while the female member is formed with an internal seat 11 correspondingly shaped to and adapted to receive the rounded end of the head 9 when the sections 5 and 6 are joined to each other. The head 9 is offset laterally with respect to the body of the male member 5.

The inner end of the female member 6 is enlarged to provide an external rim 12 having external threads 13 for a purpose presently described and which has that edge, which opposes the head 9, curved to form the seat 11 for said head 9.

Loosely fitted upon the male member 5 is a connecting collar 14 having formed at its outer end an inturned annular flange 15 for abutment with the head 9 of the male member, so that said collar 14 will be swivelled thereon, the latter being also provided with suitable internal threads at the mouth end thereof corresponding to the threads 13 on the rim 12 of the female member. In this manner the collar is detachably joined with the rim so as to connect the male and female members together as will be clearly apparent.

Formed exteriorly in the wrench engaging surfaces 16 externally on the collar 14 are spaced tangentially disposed notches 17, these being disposed in the same direction circumferentially of the collar 14 and in any one of which is adapted to be engaged the tensioning device hereinafter fully described.

Mounted in one of the wrench engaging faces 8 on the female member 6 is an anchoring lug or pin 18 with which is engaged the eye terminal 19 for the tensioning device, which comprises a single length of wire bent into a series of closely arranged convolutions or coils 20 which are disposed to surround the female member 6 between its rim 12 and the anchoring lug or pin 18 thereon, the other end portion of the wire forming the tensioning element or device is bent to provide an inverted substantially U-shaped stirrup at right angles to the plane of the coils and constitutes a locking terminal 21 for engagement in any one of the series of notches 17 peripherally in the collar 14, and the coils 20 of this device are placed under tension when the collar 14 has been worked home for connecting the male and female members 5 and 6 and the stirrup or terminal 21 is engaged or seated in one of the notches 17 of said collar 14 so that the tension will be exerted upon this collar to effect the self-tightening thereof thus eliminating any possibility of the unscrewing of such collar with the resultant separation of the members 5 and 6 of the coupling when joining the pipe sections A and B together to release the collar 14 from the tension device the stirrup or terminal 21 is disengaged from the notch 17 in which it is engaged and in this manner the tension of the coils 20 is released and thereupon the collar 14 can be unscrewed to separate the members 5 and 6 of the coupling for disconnecting the pipe sections A and B as will be clearly obvious.

What I claim is:—

1. A pipe coupling comprising interiorly threaded male and female members for connection to a pair of pipe sections and arranged in end opposed relation, said male member formed at its inner end with a head and said female member formed at its inner end with a rim providing a seat for said head, said rim being peripherally threaded, a collar surrounding the head and threadedly engaging with the rim and provided with an inwardly extending annular flange at one end surrounding said male member and abutting against said head and provided with lengthwise extending tangentially disposed peripheral notches, and a tensioning device surrounding said female member, anchored at one end thereto and having at its upper end a U-shaped stirrup selectively engaging in said notches and abutting against the ends of said collar to prevent a loosening rotation of said male and female members relatively to each other.

2. A pipe coupling comprising a pair of opposed members, one of said members being provided with external threads, and a collar provided with tangentially disposed peripheral notches and carried by the other member and being further provided with internal threads to engage said external threads for connecting said members, in combination with a tensioning element having a portion coiled around one of said members and being fixedly secured thereto, and another portion disposed at a right angle to the coiled portion and bearing against the peripheral face of said collar for successive engagement with said notches to permit a tightening rotation of said members and to prevent a loosening rotation thereof.

In testimony whereof, I affix my signature hereto.

GEORGE A. McCUEAN.